July 28, 1959 R. R. HERSHBERGER ET AL 2,896,889
FLEXIBLE RETAINER
Filed Oct. 2, 1957
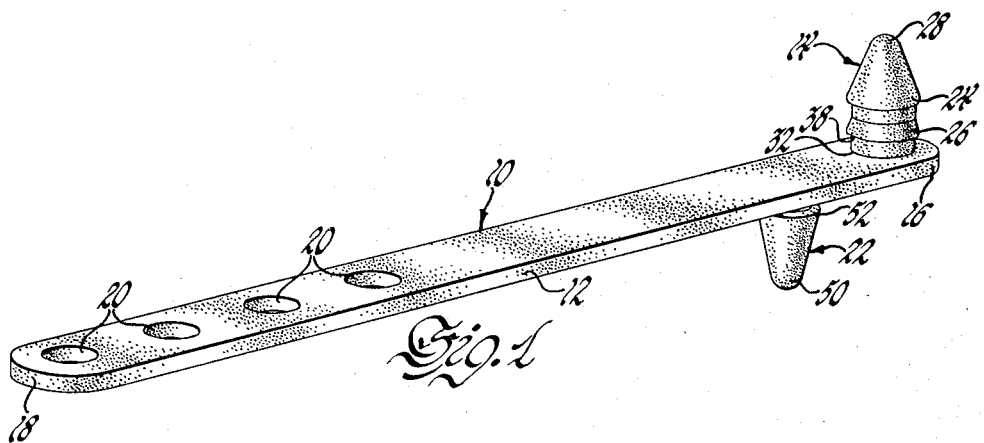
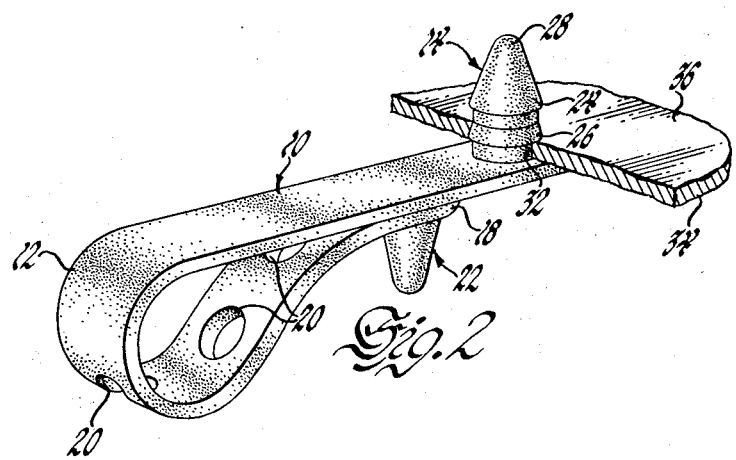
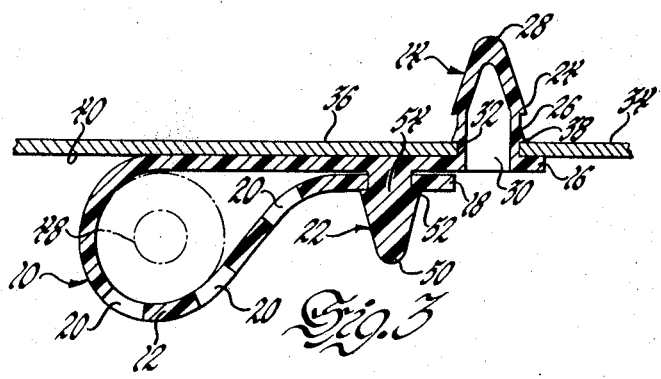
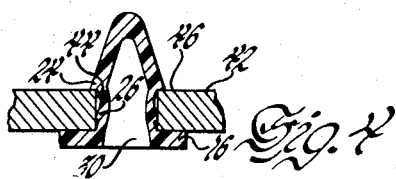
INVENTORS.
Shirrell C. Richey &
BY Russell R. Hershberger
L.D. Burch
ATTORNEY

United States Patent Office 2,896,889
Patented July 28, 1959

2,896,889

FLEXIBLE RETAINER

Russell R. Hershberger and Shirrell C. Richey, Birmingham, Mich., assignors to General Motors Corporation, Detroit, Mich., a corporation of Delaware Application October 2, 1957, Serial No. 687,808

3 Claims. (Cl. 248—71)

The invention relates to a flexible strap retainer which may be employed to mount and retain articles such as wires, tubes, rods, etc. when such articles are to be secured to a support structure.

It is often desirable in the process of assembly of machinery and other articles of manufacture to provide retainers for wiring, tubing, and similar articles which may be readily fastened to a support prior to insertion of the wires or other articles to be mounted on the support. Such retainers should be easily secured about the element to be supported without requiring excessive accuracy of location. They should be readily mounted on the support wall and about the article to be supported and should have high retentive qualities in relation to the wall as well as the supported article. A retainer embodying the invention provides these features. The retainer includes advantages of unitary construction, simplicity of manufacture, and ease of handling. It is preferably manufactured of a resilient plastic material which also effectively insulates the article electrically, thermally, and mechanically from the supporting structure. Thus the article mounted by means of the retainer is not likely to be electrically grounded through the retainer if it is of an electrical nature. Heat is not likely to be transferred through the retainer either to or from the article supported, and vibrations present in either the supported article or the supporting structure are not readily transmitted through the retainer. The retainer is provided with positive lock features for locking the retainer to the supporting structure and independently locking the retainer to the article being supported. The retainer may be readily inserted in place, it is held securely therein, and may be readily removed if desired.

In the drawing:

Figure 1 is a perspective view of a retainer embodying the invention;

Figure 2 illustrates the retainer of Figure 1 in its installed position, with parts broken away and in section;

Figure 3 is a cross section view of the retainer of Figure 1 in the installed position, the retainer being installed on a relatively thin support wall; and Figure 4 is a partial cross section view of the retainer of Figure 1 installed in a relatively thick support wall.

The retainer 10 is preferably manufactured in the form of a longitudinally extending strap 12 which is provided with a first lug 14 adjacent one end 16. The end 18 of strap 12 is provided with a plurality of apertures 20 which are linearly spaced relative to each other along the length of the strap. Retainer 10 also includes a second lug 22 which is linearly spaced from lug 14 toward the center of the strap 12. Lugs 14 and 22 extend transversely of strap 12 and are formed to extend from respectively opposite sides of the strap.

Lug 14 is preferably provided with a pair of annular barbs including an upper barb 24 and a lower barb 26. The outer end 28 of lug 14 may be rounded to permit easy insertion of the lug through an aperture in support-ing structure to which the retainer is to be attached. Lugs 14 and 22 are preferably integrally formed with strap 12 in order that full advantage may be taken of manufacturing techniques and the added strength obtained by such construction. Lug 14 may be formed to include a recess 30 which extends from the side of the strap on which lug 22 is formed through the interior of lug 14 and terminating within the rounded end 28 thereof. By providing a hollow lug formed in this manner, the lug may be readily inserted in an aperture by collapsing its outer wall slightly in order that the annular barbs 24 and 26 may pass therethrough with a minimum amount of interference. Lug 14 is illustrated as passing through aperture 32 of support wall 34 in Figures 2 and 3. Support wall 34 is illustrated in these figures as being relatively thin so that the surface 36 of wall 34 is engaged by the extreme annulus 38 of barb 26 throughout its circumference. The outer diameter of barb 26 is sufficiently larger than the diameter of apertures 32 to prevent removal of lug 14 under normal conditions. Retainer 10 is thus held adjacent surface 40 of support wall 34.

Should a support structure such as wall 42 be of such thickness that annular barb 26 cannot be passed through wall aperture 44, the wall surface 46 may be engaged by annular barb 24 in a similar manner to that of barb 26 described above. The retainer is thus mounted on support wall 42. Annular barb 26 is then in engagement with the inner cylindrical surface of aperture 44, the body of lug 14 being collapsed radially inward a sufficient extent to permit the annular barb to remain at this point without interfering with the effectiveness of the retention qualities of the lug.

Retainer 10 may be attached to a support wall as described above during any desirable assembly operation. Such retainers may be placed in position prior to the positioning of the article to be secured to the support wall. The retainer will be effectively held in position and is not subject to displacement during normal handling operations. When it is desired to secure article 48 in position, the article is positioned at approximately the center of strap 12. The strap is reversely bent so that strap body substantially encircles article 48, as is illustrated in Figure 3. One of the appropriate apertures 20 is then positioned over the end 50 of lug 22 and the strap is pushed toward the base of lug 22. The provision of a plurality of such apertures permits the retainer to be adjusted for use with articles of various sizes. Lug 22 is provided with an annular barb 52 which extends radially outward of the main body 54 of the lug to provide a locking barb. The portion of the retainer including the aperture through which the lug extends is snapped over barb 52 and retained in the position illustrated in Figures 2 and 3.

The article 48 is thus held in position adjacent support wall 34 within the loop formed by the strap body. It may be held tightly in position by selecting the proper aperture 20, or it may be held loosely in position by selecting an appropriate aperture for that purpose.

The retainer will permit limited rotation of the retainer and the article 48 about the axis of lug 14 without encountering any danger of removing the retainer from the support wall. The retainer will also strongly resist movements of article 48 in a direction generally parallel to the axis of lugs 14 and 22 since the annular barbs on the lugs provide an effective lock. The plastic materials from which the retainer may be manufactured are preferably sufficiently resilient to permit unlocking of the lugs when desired so the retainer 10 or the article 48 may be readily removed if necessary.

What is claimed is:

1. In a retainer for attaching and supporting an article to a support structure, a flexible strap having a first lug integrally formed therewith and transversely extending from one end thereof, a second lug integrally formed therewith and transversely extending in an opposite direction from said first lug and longitudinally spaced on said strap from said first lug, said strap having a plurality of apertures formed therein adjacent the end opposite said first lug and in substantial linear alignment with said lugs, said strap being adapted to be reversely bent whereby said second lug is received through one of said apertures to lock said strap end to said second lug whereby a support loop is formed for receiving said article to be supported, said first lug being attached to extend through an aperture in said support structure and resiliently lock said retainer to said structure.

2. A flexible retainer having a longitudinal body, a transversely extending first lug integrally formed therewith adjacent one end, a transversely extending second lug integrally formed therewith and extending in a direction opposite to said first lug and inwardly spaced therefrom on said body, said body having at least one aperture formed in the end opposite said lugs and in linear alignment therewith, said first lug having a plurality of axially spaced annular barbs formed thereon and spaced from said retainer body, said second lug having an annular barb formed thereon and spaced from said retainer body, said first lug having a hollow recess formed therein to permit limited resilient radial collapse of said lug, said retainer being attached to a support structure by said first lug and to an article to be supported by said second lug and said body aperture.

3. In combination, a retainer and a support structure for said retainer and an article to be supported on said structure by said retainer, said support structure having an aperture formed therein, said retainer having a hollow lug integrally formed thereon adjacent one end, said lug having an annular barb formed therein and axially spaced on said lug from said retainer, said support structure aperture receiving said lug therethrough, said annular barb locking said retainer to said support structure, said retainer further having a second lug integrally formed therewith and extending therefrom in a direction opposite said first lug and having an annular barb formed thereon in spaced relation to said retainer, said retainer having an aperture formed therein in linear alignment with and in spaced relation to said lugs, said retainer being reversely bent intermediate said aperture and said second lug to form a loop receiving said article being supported, said second lug being received through retainer aperture whereby said annular barb is interlocked with the apertured portion of said retainer.

References Cited in the file of this patent
UNITED STATES PATENTS

| | | |
|---|---|---|
| 796,688 | Witty | Aug. 8, 1905 |
| 1,479,150 | Mellus | Jan. 1, 1924 |
| 2,709,290 | Rosenthal | May 31, 1955 |
| 2,759,390 | Edwards | Aug. 21, 1956 |